Sept. 24, 1935.                A. L. BOISVERT                2,015,057
                                 TRANSMISSION
                            Filed March 23, 1935          2 Sheets-Sheet 1
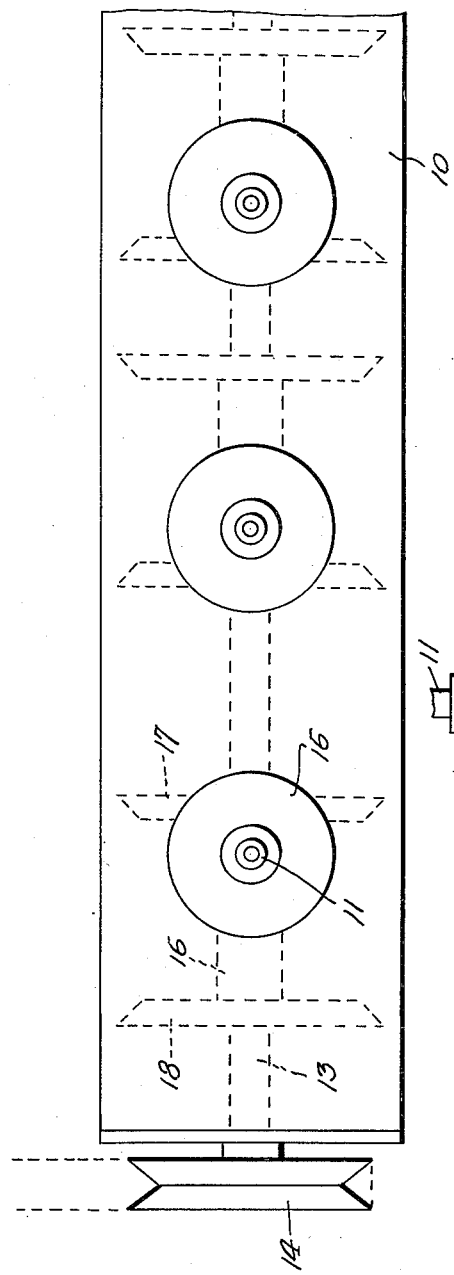
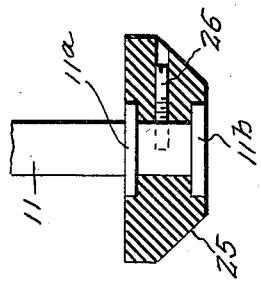
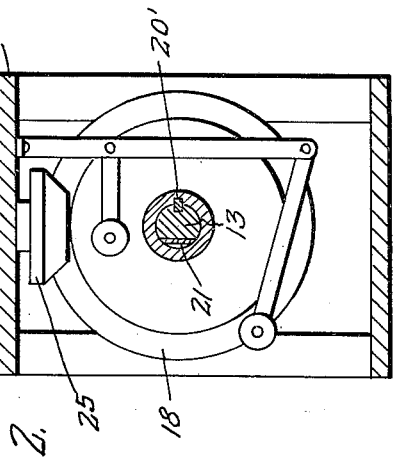
Inventor
*Arthur L. Boisvert,*
By *Clarence A. O'Brien*
                      Attorney Sept. 24, 1935.  A. L. BOISVERT  2,015,057
TRANSMISSION
Filed March 23, 1935  2 Sheets-Sheet 2
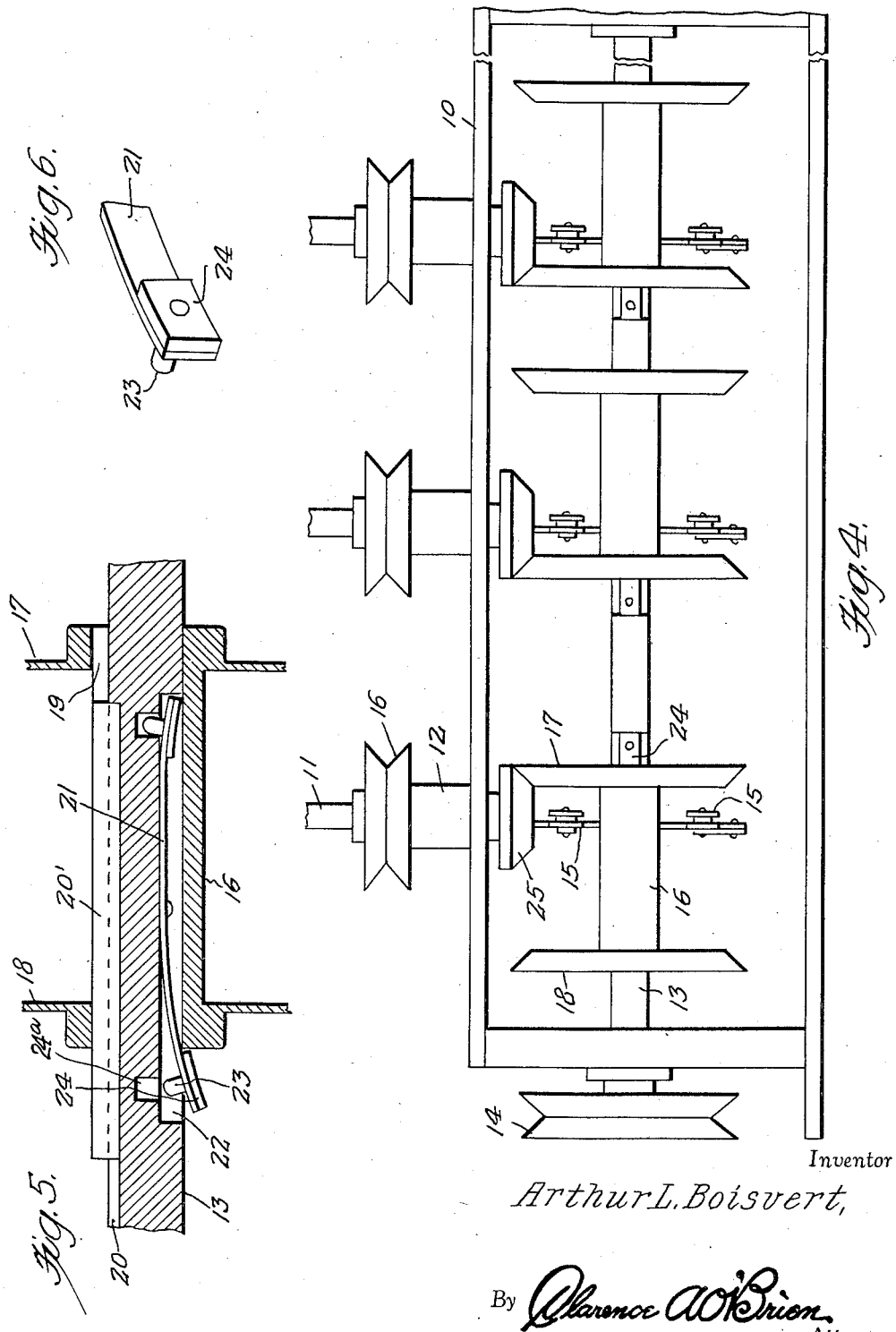
Inventor
Arthur L. Boisvert,
By Clarence A. O'Brien
Attorney Patented Sept. 24, 1935

2,015,057

UNITED STATES PATENT OFFICE 2,015,057

TRANSMISSION

Arthur L. Boisvert, Keene, N. H.

Application March 23, 1935, Serial No. 12,723

3 Claims. (Cl. 74—202)

This invention relates broadly to machines of the type used in covering rubber and more particularly the invention resides in the provision of improved means for driving the spindles of such machines.

An object of the present invention is to eliminate the belt and pulley drive means for the spindle and to substitute therefor a positive drive for the spindle and which drive is quickly shiftable for changing over from one drive to a reverse drive.

Further in accordance with the present invention, the drive connection between the spindle shaft and the driving shaft is in the form of frictionally engaging disks cooperating to insure a positive and efficient drive for the spindle.

The invention together with its objects and advantages will be best understood from a study of the following description taken in connection with the accompanying drawings wherein:

Figure 1 is a top plan view illustrating the application of the invention.

Figure 2 is a sectional view.

Figure 3 is a detail view showing the manner of securing the pulley to a spindle.

Figure 4 is an elevational view further illustrating the invention.

Figure 5 is a fragmentary detail sectional view showing the manner of slidably mounting a disk assembly on the driving shaft.

Figure 6 is a perspective view of one end of the spring lock forming part of the invention.

Referring to the drawings by reference numerals it will be seen that 10 indicates generally the frame of a machine for covering rubber, which machine embodies among other parts a series of vertical spindles 11 journaled in suitable bearings 12 mounted therefor on the top of the frame 10. Also journaled in and supported by the frame 10 is a spindle driving shaft 13 equipped on one end with a pulley 14 for cooperation with a belt or the like for driving the shaft 13 from a suitable source of power. For each member 11 there is also mounted on the frame 10 the usual guide pulley assembly 15 forming part of the machine and not of the essence of the present invention. The spindles 11 are also equipped with the usual pulleys 16 which may be used, when desired, for driving the spindles 11 by belt and pulley drive means when it is not desired to use the drive means in the present invention.

In accordance with the present invention there is mounted on the shaft 13 for each spindle 11 a disk assembly consisting of a hub 16 provided on the ends thereof with a driving disk 17 for driving the spindle 11 in one direction and a driving disk 18 for driving the spindle 11 in a reverse direction. The hub 16 is provided with a way 19 cooperating with a way 20 provided on the shaft 13 for receiving a key 20' whereby the disk assembly is mounted on the shaft for rotation therewith and for axial movement relative to the shaft.

The shaft 13 is also provided, for each disk assembly with a spring catch or stop device consisting of a leaf spring 21 anchored intermediate its ends within a longitudinal slot 22 provided in one side of the shaft 13 as best shown in Figure 5. At the ends thereof the spring 21 is provided on one side with pins 23 serving as guide pins and adapted, when the end of the spring is forced into the groove or recess 22 to enter a housing socket 24a provided therefor in the shaft 13. At each end thereof the spring 21 on the side thereof opposite to the pins 23 is provided with a stop lock 24 as shown in Figures 5 and 6 arranged to engage an adjacent end of the pulley assembly as shown in Figure 5 for retaining the selected disks 17, 18 in driving engagement with the substantial conical surface of a driven disk 25 provided on the lower end of the spindle 11 and within the frame 10.

The disks 25 provided on the lower ends of the spindles 11 are preferably formed of rubber having recesses in their upper and lower faces for receiving collars 11a, 11b, on the lower end of the spindle as shown in Figure 3. Further, the disk 25 is radially bored for accommodating a set screw 26 that serves to secure the disk 25 on its spindle 11 rigidly.

From the above it will be apparent that with either the disk 17 or 18 in frictional engagement with the disk 25 of the spindle 11 drive will be transmitted from the shaft 13 to the spindle 11 for positively rotating the same in the desired direction. For reversing the directional rotation of the selected spindle all that is necessary, is with the fingers or with a suitable tool to force the outwardly projecting end of the spring 21 inwardly of the groove 22 whereupon the disk assembly is free to slide axially of the shaft 13 for moving, for example, the disk 17 out of driving engagement with the disk 25, and the disk 18 into frictional driving engagement with the disk 25. The disk 18 is thus engaged with the disk 25 and an end portion of the recess or groove 22 will be exposed so that the proper end of the spring 21 will project outwardly of the groove or recess 22 to engage the associated stop member 24 with the adjacent end of the pulley assembly as shown in Figure 5 thus retaining, in this instance, the disk 18 in frictional driving engagement with the disk 25.

The utility and advantages of an invention of this character will be apparent from the foregoing.

Having thus described the invention, what is claimed as new is:

1. In a machine of the class described, a rotatable spindle having a frusto conical disk of rubber affixed thereon, of a shaft mounted for rotation and arranged at right angles to the spindle, a friction disk assembly mounted on the shaft for rotation therewith and also for axial movement along the shaft and relative thereto, said friction disk assembly including a hub and a pair of spaced apart frusto conical disks fixed thereon for selective engagement with the spindle disk; a spring keeper member secured in fixed position on said shaft, and stop means on the respective opposite ends of said spring member for engagement with the respective ends of the disk assembly for releasably retaining a selected disk of said assembly engaged with the spindle disk.

2. In a mechanism of the class described, a spindle, a drive shaft, a disk fixed on the spindle, a pair of disks mounted on the drive shaft for rotation therewith, and movable axially relative to the drive shaft into and out of engagement with the disk on the spindle, a hub connecting said pair of disks, a spring member secured to the drive shaft and substantially concealed by said hub, and stop members on the respective opposite ends of said spring for selective engagement with the disks on the drive shaft to releasably retain a selected one of the drive shaft disks engaged with the spindle disk.

3. In a transmission mechanism, the combination of a driving member and a driven member, power transmission means for transmitting drive from the driving to the driven member and including a power transmission assembly having a hub connected with the driving member to be driven thereby and to shift axially relative to the driving member, said driving member having an elongated slot, a leaf spring anchored intermediate its ends in said slot, and stop members on the respective opposite ends of said spring for selective engagement with the respective opposite ends of the hub for retaining the latter at the desired longitudinal adjustment on the driving member, as and for the purpose specified.

ARTHUR L. BOISVERT.